United States Patent
Sackett et al.

(10) Patent No.: US 8,184,864 B2
(45) Date of Patent: May 22, 2012

(54) PROCESS FOR MANUFACTURING KITTING FOAM INSERTS

(75) Inventors: Steven R. Sackett, Gulf Breeze, FL (US); Arlen R. Hill, Jr., Pensacola, FL (US)

(73) Assignee: Steven R. Sackett, Gulf Breeze, FL (US)

( * ) Notice: Subject to any disclaimer, the term of this patent is extended or adjusted under 35 U.S.C. 154(b) by 754 days.

(21) Appl. No.: 12/322,323

(22) Filed: Feb. 2, 2009

(65) Prior Publication Data

US 2010/0193385 A1     Aug. 5, 2010

(51) Int. Cl.
*G06K 9/00* (2006.01)
*B65D 85/20* (2006.01)

(52) U.S. Cl. .......................... 382/111; 206/373; 206/370

(58) Field of Classification Search .................. 382/100, 382/110, 111; 206/372, 564, 389, 557, 380, 206/443, 373, 370
See application file for complete search history.

(56) References Cited

U.S. PATENT DOCUMENTS

| | | | | |
|---|---|---|---|---|
| 4,182,448 A | * | 1/1980 | Huck et al. | 206/380 |
| 4,344,532 A | * | 8/1982 | Eldridge et al. | 206/370 |
| 4,964,514 A | * | 10/1990 | Wycech | 206/564 |
| 5,320,223 A | * | 6/1994 | Allen | 206/372 |
| 7,410,053 B2 | * | 8/2008 | Bowen et al. | 206/373 |

* cited by examiner

*Primary Examiner* — Vikkram Bali
*Assistant Examiner* — Nancy Bitar
(74) *Attorney, Agent, or Firm* — Steven R. Sackett; Arlen R. Hill, Jr.

(57) ABSTRACT

This invention protects the processes and technologies used to produce kitting foam inserts. The manufactured inserts are in the form of foam silhouettes with a thin hard plastic backing. The process is unique in that it utilizes software and automations that were previously unknown in the kitting industry. The hard plastic backed foam inserts will retain the positions of items within the kit and allow, at a glance, identification of missing or displaced items and tools. The foam inserts also provide for rapid restocking of reusable assembly kits. Pocket marks can incorporate human and/or machine-readable symbols into the foam inserts. This patent is unique with respects to the referenced U.S. Pat. No. 7,410,053 B2 in that this invention describes in detail the manufacturing process for producing foam kitting inserts to be used for organizing tool and assembly kits. Key differences in this invention and the cited patent are the fact that the product of the current invention contains no clear layers, both the pocket and the items are marked, the item description is marked inside of the pocket perimeter, and the thickness of the layers specified in the cited patent is in direct contrast to the layer thickness specified herein, specifically the top layer is always several times thicker than the bottom layer herein.

11 Claims, 4 Drawing Sheets

PROCESS FOR MANUFACTURING KITTING FOAM INSERTS

REFERENCES CITED

U.S. Patent Documents

U.S. Pat. No. 7,410,053 B2 August 2008 Bowen

COMPUTER PROGRAM LISTING APPENDIX—SUBMISSIONS ON COMPACT DISC

The contents of the following submissions on compact discs are incorporated herein by reference in its entirety: A compact disc copy of the cited software (COPY 1) (file name: Module1.bas, date created: 19, Jan. 2009, size on disc: 20,480 bytes, format: ASCII, note: automation script; file name: Automaster.xls, date created: 19, Jan. 2009, size on disc: 16,384 bytes, format: Microsoft Excel 2000, note: example of required columnar format; file name: calibration_board.pdf, date created: 19, Jan. 2009, size on disc: 118,784 bytes, format: Adobe Acrobat, note: Calibration Pattern; file name: fiducial.pdf, date created: 19, Jan. 2009, size on disc: 73,728 bytes, format: Adobe Acrobat, note: Scaling Pattern; file name: PKOTool.exe, date created: 19, Jan. 2009, size on disc: 618,496 bytes, format: Windows executable, note: Run from folder on C:\drive; file name: cv100.dll, date created: 19, Jan. 2009, size on disc: 847,872 bytes, format: Supporting dll, note: Place in folder with PKOTool.exe; file name: cvaux100.dll, date created: 19, Jan. 2009, size on disc: 602,112 bytes, format: Supporting dll, note: Place in folder with PKOTool.exe; file name:cvcam100.dll, date created: 19, Jan. 2009, size on disc: 49,152 bytes, format: Supporting dll, note: Place in folder with PKOTool.exe; file name: cxcore100.dll, date created: 19, Jan. 2009, size on disc: 1,015,808 bytes, format: Supporting dll, note: Place in folder with PKOTool.exe; file name: cxts001.dll, date created: 19, Jan. 2009, size on disc: 135,168 bytes, format: Supporting dll, note: Place in folder with PKOTool.exe; file name: highgui100.dll, date created: 19, Jan. 2009, size on disc: 630,784 bytes, format: Supporting dll, note: Place in folder with PKOTool.exe; file name: libguide40.dll, date created: 19, Jan. 2009, size on disc: 196,608 bytes, format: Supporting dll, note: Place in folder with PKOTool.exe; file name: ml100.dll, date created: 19, Jan. 2009, size on disc: 253,952 bytes, format: Supporting dll, note: Place in folder with PKOTool.exe; file name: 080123 ProKits User Manual.doc, date created: 19, Jan. 2009, size on disc: 1,736,704 bytes, format: Microsoft Word, note: User Manual;); a duplicate compact disc copy of cited software (COPY 2) (file name: Module1.bas, date created: 19, Jan. 2009, size on disc: 20,480 bytes, format: ASCII, note: automation script; file name: Automaster.xls, date created: 19, Jan. 2009, size on disc: 16,384 bytes, format: Microsoft Excel 2000, note: example of required columnar format; file name: calibration_board.pdf, date created: 19, Jan. 2009, size on disc: 118,784 bytes, format: Adobe Acrobat, note: Calibration Pattern; file name: fiducial.pdf, date created: 19, Jan. 2009, size on disc: 73,728 bytes, format: Adobe Acrobat, note: Scaling Pattern; file name: PKOTool.exe, date created: 19, Jan. 2009, size on disc: 618,496 bytes, format: Windows executable, note: Run from folder on C:\drive; file name: cv100.dll, date created: 19, Jan. 2009, size on disc: 847,872 bytes, format: Supporting dll, note: Place in folder with PKOTool.exe; file name: cvaux100.dll, date created: 19, Jan. 2009, size on disc: 602,112 bytes, format: Supporting dll, note: Place in folder with PKOTool.exe; file name:cvcam100.dll, date created: 19, Jan. 2009, size on disc: 49,152 bytes, format: Supporting dll, note: Place in folder with PKOTool.exe; file name: cxcore100.dll, date created: 19, Jan. 2009, size on disc: 1,015,808 bytes, format: Supporting dll, note: Place in folder with PKOTool.exe; file name: cxts001.dll, date created: 19, Jan. 2009, size on disc: 135,168 bytes, format: Supporting dll, note: Place in folder with PKOTool.exe; file name: highgui100.dll, date created: 19, Jan. 2009, size on disc: 630,784 bytes, format: Supporting dll, note: Place in folder with PKOTool.exe; file name: libguide40.dll, date created: 19, Jan. 2009, size on disc: 196,608 bytes, format: Supporting dll, note: Place in folder with PKOTool.exe; file name: ml100.dll, date created: 19, Jan. 2009, size on disc: 253,952 bytes, format: Supporting dll, note: Place in folder with PKOTool.exe; file name: 080123 ProKits User Manual.doc, date created: 19, Jan. 2009, size on disc: 1,736,704 bytes, format: Microsoft Word, note: User Manual;)

11 Claims, 4 Drawing Sheets

BACKGROUND OF THE INVENTION

Typically items placed in single or multi-level toolboxes, kits, and assembly jigs are free to move about within the drawers with no form of support or restraint. The process of outlining the items for the purpose of manufacturing foam insert restraints for these kits has traditionally been performed by hand. The item outlines were traced onto paper and scanned into a computer or the outlines were manually cut, burned, or melted directly into the foam inserts for the kit drawers. These labor-intensive methods resulted in rough edges and frequent errors induced by the multi-step manual process. Due to the amount of labor involved in producing foam inserts in these ways, the cost of restraining the items by foaming a standard kit was traditionally very high.

The present invention relates to a process of manufacturing foam inserts for item containers used by machine shops, aerospace assembly plants, garages, and military bases; specifically a reliable, quick, and automated means of manufacturing durable layered inserts for use in tools kits and component assemblies. Inserts for the drawers are formed using the methods described in the present invention to produce precise outlines of the item's shapes. The outlines, or silhouettes, of these shapes are computer generated from a digital photograph of the items, then machined using proprietary software into a variety of foam materials as cutouts, or pockets, and backed with thin rigid plastic known as the backing. The assembled foam inserts provide for inventory control, ease of use, foreign object damage control, and at a glance item replacement. Using the methods described in the present invention, inserts for new and/or existing items to be stocked in the kits and assemblies can be quickly manufactured from common digital photographs of the items.

The foam inserts produced by this manufacturing process are unique from the 'tool holders' described in the referenced U.S. Pat. No. 7,410,053 B2 (Bowen et al), in that the foam inserts produced by the current invention are marked within the pocket and not adjacent to the pocket, the inserts have no clear layers, and the item cutouts extend completely through all layers except the backing. Additionally, the novel software and methods presented herein are used in the manufacturing of the foam inserts.

SUMMARY OF THE INVENTION

In order to produce accurate item outlines, the new or existing tools and/or components (FIG. 2, Reference 23) to be kitted are placed in the calibrated and controlled lighting environment. An example of such an environment is the Line Image System (LIS) booth (FIG. 2, Reference 22) backlit with a flat flexible electro luminescent E-Lite (FIG. 2, Reference 24). The LIS booth can be setup and configured in advance at a remote site or in the manufacturing warehouse as required. The items are arranged, and then photographed using a digital camera (FIG. 2 Reference 21) against a backlit fiducial pattern (FIG. 2, Reference 25) inside the LIS booth. The Joint Photographic Experts Group (JPG) formatted images are then processed manipulated using proprietary software, cleaned up, and then converted into the common Drawing Exchange Format (DXF) electronic file format and exported to a Computer Aided Design (CAD) software program. Using the CAD software the image outlines are arranged in the final layout and then labeled with part numbers (Etch Codes) or a brief description of the item (Pocket Mark). Using custom written scripts, the Computer Numerical Control (CNC) machine code files (DXF, FGC, and TLG electronic file formats) are generated and exported. The item outlines are then verified for accuracy by cutting the foam using the CNC electronic files supplied by the custom software. Next the hard plastic backing size is verified for accuracy, machined, and applied to the back of the foam cutouts using Pressure Sensitive Adhesive (PSA) which was applied to one side of the foam at the manufacturer. The assembled foam and plastic backings are now considered 'foam inserts'. Pocket marks are then applied to the plastic backing inside each of the cut out item outlines (pockets) of the assembled foam inserts. If a code for control purposes is required by the customer, the appropriate items are then placed into the foam inserts and the required codes are applied to the items using the marking information in the electronic control files generated by the custom scripts within the software. Lastly, the completed foam inserts are assembled into kits or vacuum shrink-wrapped and shipped to the customer for assembly by the customer on site.

DETAILED DESCRIPTION

Figure 2:
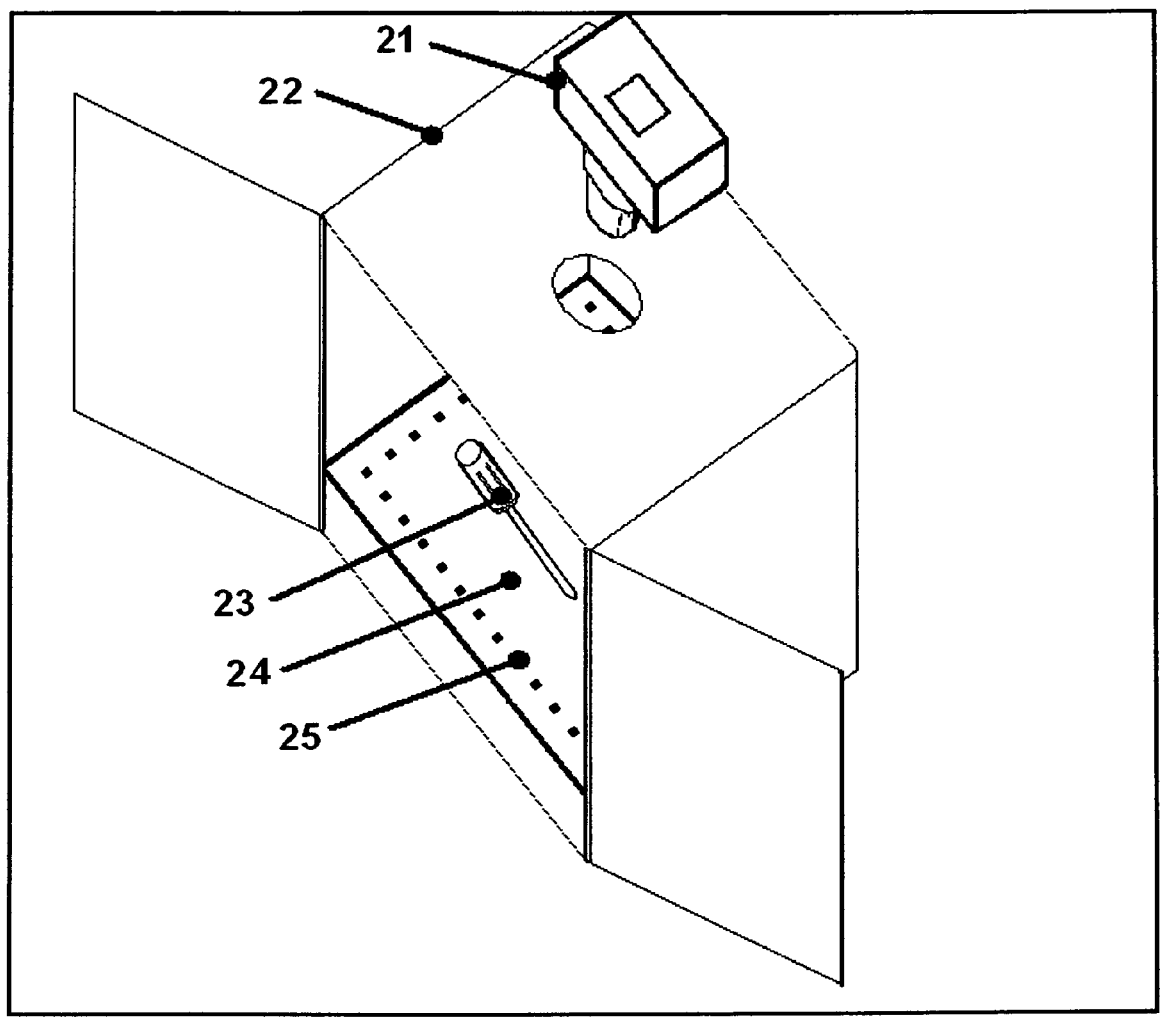
FIG. 2: Shows the basic design of a typical Line Image System booth.
Figure 3:
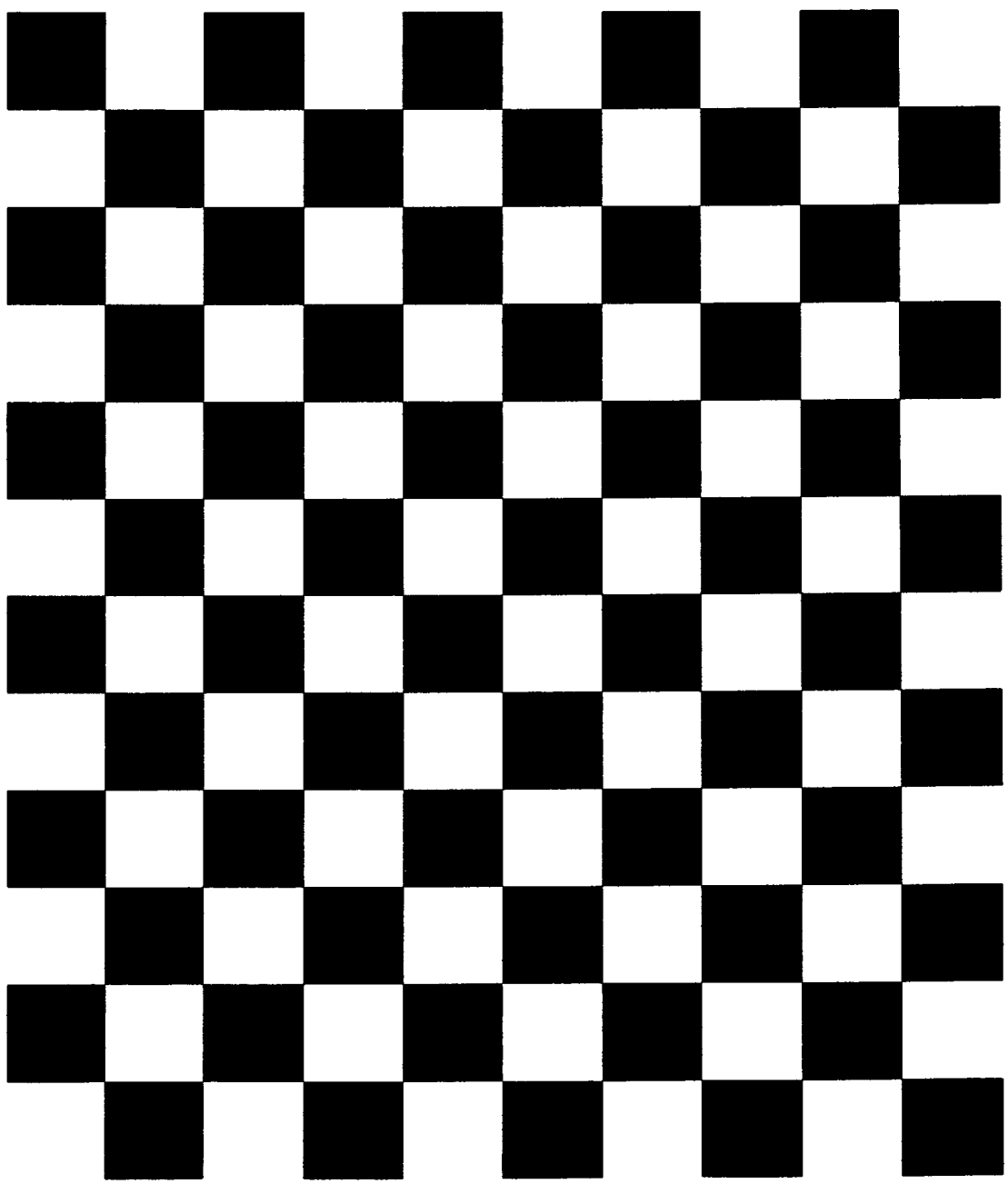
FIG. 3: A drawing of the calibration chessboard grid. The grid is not to scale. For proper calibration the grid must be 8.5"×11" and printed at 300 dots per inch.
Figure 4:
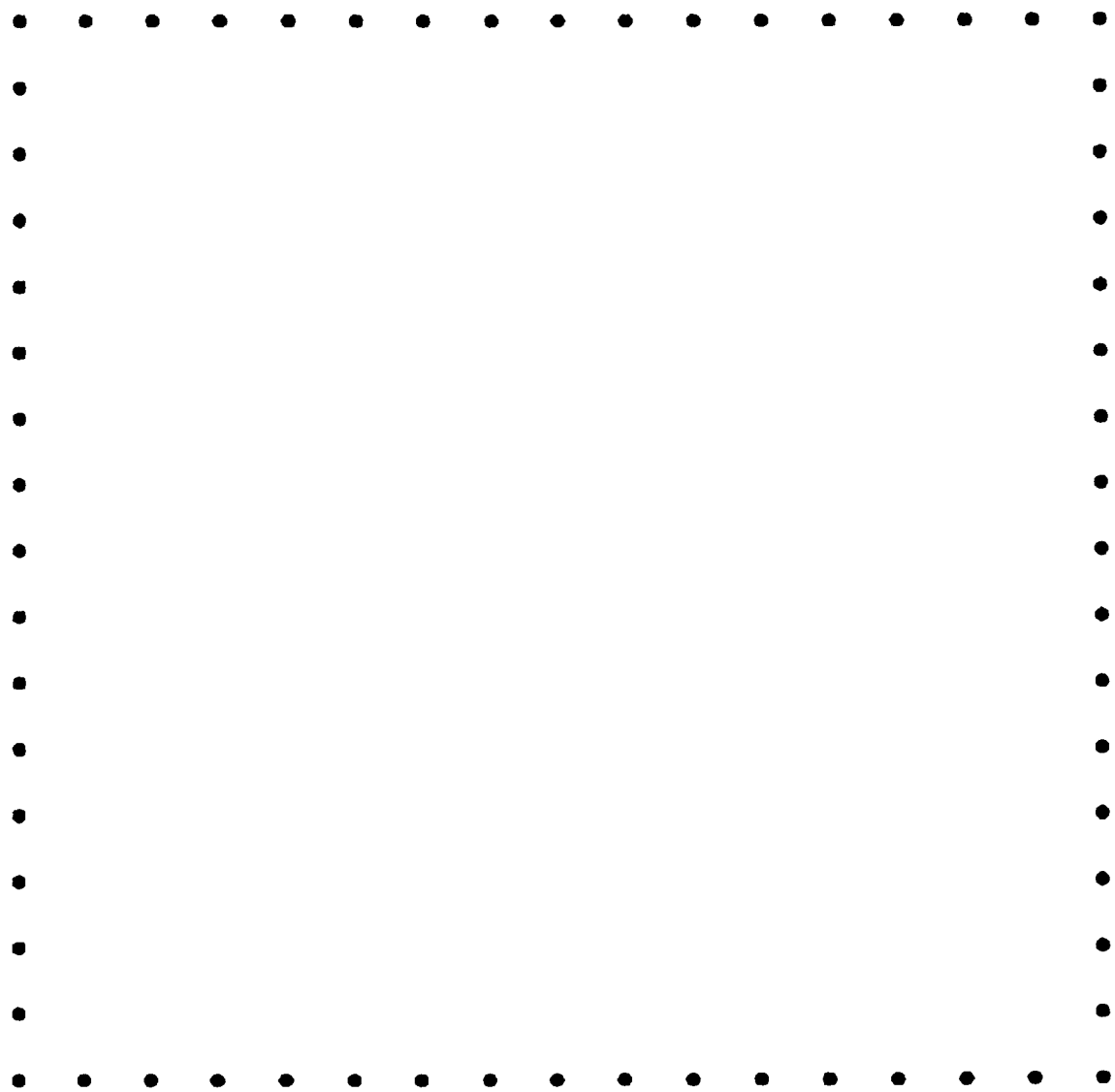
FIG. 4: A drawing of a scaling fiducial. The drawing is not to scale. The fiducial actual size must be at 27"×27" and printed at 300 DPI.

In order to achieve item outlines accurate to one thirty-seconds of an inch, a controlled lighting environment and proper calibration are critical to the success of the software (Copy 1 PKOTool.exe) to accurately reproduce the item outlines in digital format. The complete calibration and software installation procedures are outlined in the user manual on the accompanying compact disc (Copy 1 080123 ProKits User Manual.doc). Using a light tight booth with a back lite conveniently normalizes this environment. The name given to such a booth is the Line Image System, or LIS booth. The LIS booth is arranged as shown in FIG. 2 with the selected backlighting. The software and hardware is calibrated using a series of photos of the printed to scale calibration chessboard pattern (Copy 1 calibration_board.pdf), shown in FIG. 3. These photos are taken from slightly different camera angles, while the pattern is within the LIS booth. Any change in the camera or photographic environment (lighting, focus, resolution, etc.) will require recalibration of the hardware and software using this process. The calibration procedure is detailed in section 3.4 of the '080123 Prokits User Manual.doc' file on the compact disc Copy 1 appended to this patent. After calibration is complete the chessboard pattern is then removed from the booth and an actual scale (27"×27" at 300 DPI) printed transparency containing a fiducial pattern (Copy 1 fiducial.pdf), as the example pattern shown in FIG. 4, is placed in the booth. The actual scale fiducial pattern must appear in every image to be processed by the software. The items to be kitted are then placed in the booth. Multiple items can be photographed in a single image so long as the fiducial pattern is not obscured. The focal length, positioning, and resolution of the camera chosen limit the imaging area and therefore, the number of items that may be simultaneously photographed.

Using the calibrated LIS booth, either in house or at the customer's facilities, a series of digital photographs are taken of the backlit kit items (FIG. 2, Reference 23) to be fitted with foam inserts. The JPG formatted photos are imported into the calibrated LIS software and processed via the LIS software (Copy 1 PKOTool.exe, and the eight supporting dll files: cv100.dll, cvaux100.dll, cvcam100.dll, cxcore100.dll, cxts001.dll, highgui100.dll, libguide40.dll, ml100.dll) that converts the JPG photos into DXF formatted outlines of each item accurate to one thirty-second of an inch. The input source of the digital photos of the items can be obtained in electronic format via email, website, local computer, or directly from the digital camera. The sole requirement for the source photos is that the calibration image used in processing them must have been taken with identical lighting and camera settings (focal length, zoom, resolution, color, white balance, etc.) as the photos to be processed. After a short manual clean up stage within the PKOTool.exe software, the exported clean DXF file is saved. The file is then manipulated via a CAD interface capable of executing custom Visual Basic scripts, such as AutoCAD by AutoDesk, where a worker adds process and inventory control information via a spreadsheet columnar formatted exactly as shown in, Copy 1 Automaster.xls, by executing the custom coded software script, Copy 1 Module1.bas.

As part of the scripting routine, the custom coded software script also automatically generates several machine-coded files in the fgc, tlg, and dxf electronic file formats by combining the CAD file with data from a supporting spreadsheet. These software's and their source codes are considered trade secrets. These output machine code files are used to automate the cutting and marking stages of this manufacturing process. The cutting head and its control software can be any one of several compatible software and hardware combinations well known to the machining industry. An example of a cutting head system is the MillWrite software used to control an industry standard 250-Watt Carbon Dioxide Gas Laser as the cutting device mounted to a standard XY table. Any cutting software and compatible cutting device are acceptable for use in this process.

Figure 1:
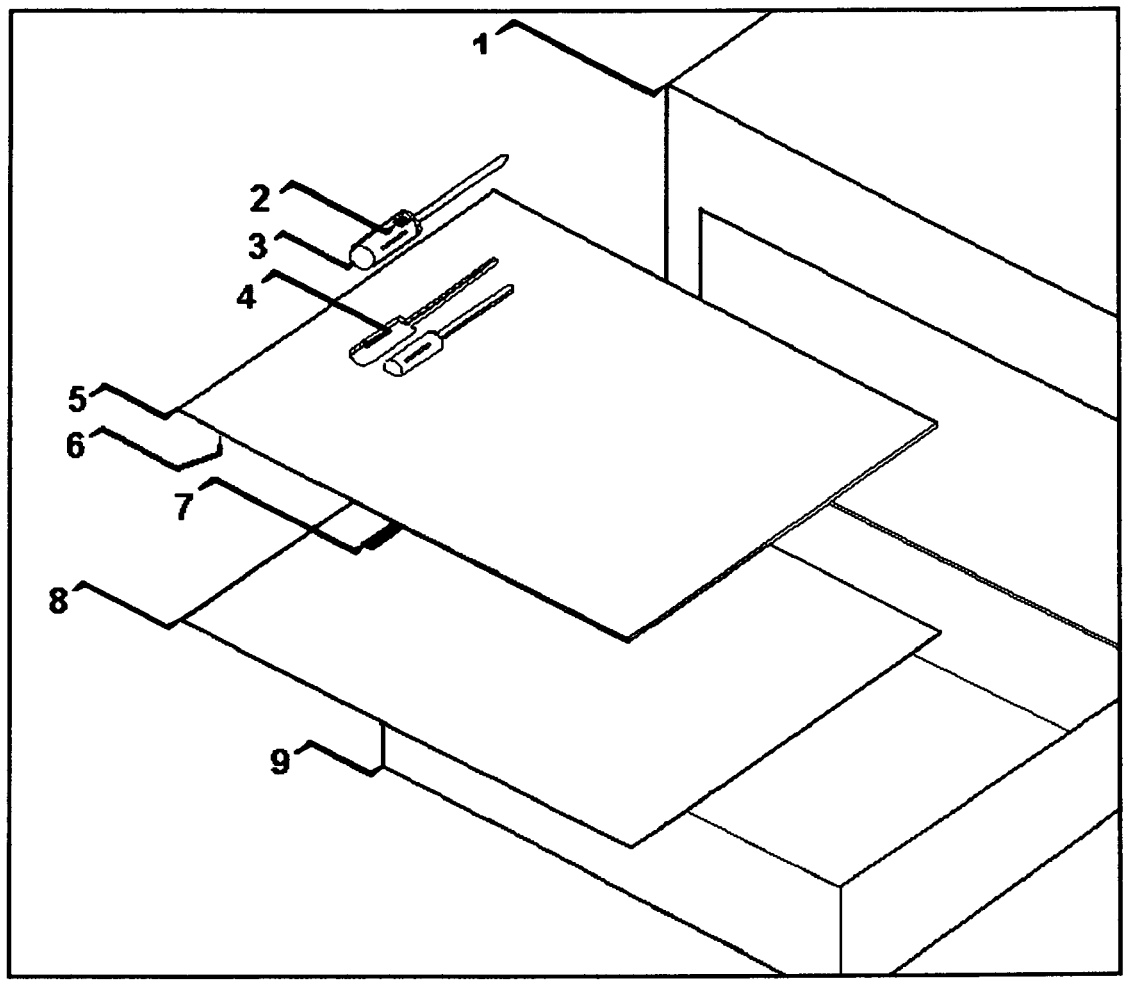
FIG. 1: Shows an exploded view of a kit and drawer with a foam insert containing two items.

The DXF files containing the item outlines are sent to the computer controlling the cutting head, which is fitted to an industry standard motor controlled XYZ table. A single test run is performed to insure the accuracy of the initial cut pattern. Once the pattern accuracy is confirmed, the cutting software sequentially cuts multiple copies of the items into large sheets of foam (FIG. 1, Reference 5) until the desired numbers of foam silhouette outlines have been created for each drawer. The foam is manufactured with an integrated backing of PSA. The PSA side as indicated by FIG. 1, Reference 6 of the foam sheet is protected by a thin layer of waxy paper that prevents the sheets from sticking to one another or the cutting surface during the cutting process. The cut out silhouette outlines form the precise 'pockets' (FIG. 1, Reference 4) to securely hold the items in each drawer of the kit or assembly.

Sheets of hard plastic (FIG. 1, Reference 8) are now placed on the XYZ table and the required shapes of the backings for the foam inserts are cut using the cutting head and software. As with the foam outline process, a test run is performed to insure accuracy of the backing. Once the hard plastic backs are all cut, the wax paper is removed and they are affixed to the backs of the corresponding foam outlines to produce the hard backed inserts for each drawer in the kit. The assembled the hard backed foam silhouette inserts are termed 'foam inserts'.

The foam inserts are now ready for the pocket marks (FIG. 1, Reference 7). Pocket marks consist of information that the customer has requested to be placed within the pockets to identify the item at that location. These marks can consist of human readable text, machine-readable symbols (i.e. barcodes), or both. The marking information was previously imported via the information recorded in the Automaster.xls file referenced above. Typical pocket marks contain a brief, often abbreviated, description of the item that belongs in a particular pocket of the drawer. The pocket mark is applied by placing the assembled drawers on a second XYZ table, which has a marking head mounted on it. Optionally this marking routine can be integrated into the cutting routine previously mentioned.

The marking head and XYZ table software are simultaneously sent the marking and position control information (fgc, tlg, and DXF file formats) that was generated from the original DXF layer by the custom software referenced above. The marking head is interfaced via compatible marking software, several of which are well known to the industry. The marking routine also simultaneously interfaces the to the motions of the XYZ table via a compatible CNC software. Examples of marking and CNC control software are Waverunner by Nutfield Technologies, Inc controlling a Solid State Yttrium Diode Laser and FlashCut CNC for the XYX table positioning control.

Upon completion of the pocket mark routine the drawers are ready for the appropriate items (FIG. 1, Reference 3) to be inserted. Serialization and/or inventory control codes, etch codes; (FIG. 1, Reference 2) can be directly etched by the marking head onto the items in the pockets as required by the customer. The item etch codes are applied via the same process as the pocket marks above using the machine code files generated by the custom software script mentioned above.

The completed foam inserts are placed into their respective drawers (FIG. 1, Reference 9) in the kit (FIG. 1, Reference 1) chosen by the customer. The kits are then shipped to the customers. Alternately, the completed foam inserts can be individually vacuum shrink wrapped and shipped directly to the customer for on site assembly.

What is claimed:

1. An automated process of manufacturing kitting foam inserts comprising:
    calibration of proprietary software within a controlled lighting environment;
    digitally photographing the items to be kitted against a fiducial pattern for scaling; importing and converting the digital photographs to accurate outlines of the items; generating a controlled codes and files and export the control codes and files needed for the cutting and marking manufacturing processes; cutting the item outlines into an insert material; cutting a backing outlines from a backing material;
    assembly of the foam inserts by joining the insert material and backing material via Pressure Sensitive Adhesive; marking an item data adjacent to the pocket of the foam inserts;
    inserting the items into the respective pocket; and marking the items with customer supplied etch code.

2. A method for calibration in claim 1 comprises:
    maintaining a constant distance and focus from the camera to calibration surface; a consistently flat calibration surface; taking several photographs of the calibration image printed to scale; taking all photos in either color or black and white; taking all photos between five to seven mega pixels resolution; storing all photos in any one of several well-known JPG file formats; using an imaging device with all of the above capabilities to acquire the digital photos; using the same imaging device, device settings, and lighting environment for all photos; recalibrating if any of the above conditions change.

3. A method of controlling the lighting environment in claim 1 consisting of:
    a proprietary booth; a line image system; a slat flexible electro luminescent E-lite; or any environment where lighting, distance, focal length, and background color can be controlled.

4. A method of accurately lighting the images in claim 1 consist of any combination of:
    a backlight, which provides background illumination of the items; several high intensity surrounding lights which eliminates shadows; lighting chosen to meet the customers imaging requirements.

5. A method of accurately scaling the digital photographs in claim 1 consisting of:
    using a standard fiducial pattern such as a 27".times.27" 300 DPI scale print out; insuring the fiducial pattern is not be obscured by items in the image; evenly lighting of the fiducial pattern to minimize shadows; maintaining a consistent camera distance, focal length, and zoom level to the fiducial pattern; placing the fiducial pattern on a flat surface; including the fiducial pattern in every photo for proper image processing by the software.

6. A method of importing and converting the item images as listed in claim 1 to perimeter outlines consisting of:
    importing the digital photos of the items in electronic format
    converting the imported digital images to DXF outlines accurate to one thirty-seconds of an inch using the proprietary software; adding inventory and control information to the DXF file using any industry standard CAD software capable of processing custom software scripts.

7. A method to generate and export machine code files listed in claim 6 consisting of: executing the software script Module1.bas, used conjunction with a spreadsheet file, Automaster.xls, on the modified DXF file; generating, via the script, the 6 output files for needed the marking process; adding, via the script, the customer inventory control codes to DXF output file; adding, via the script, customers item descriptions to output DXF file; generating, via the script, a TLG marking file containing the item positions; generating, via the script, a TLG etching file containing the etch code positions; generating, via the script, a FGC consisting of a pocket mark routine for the XYZ table; generating, via the script, the FGC file consisting of the etch code routine for the XYZ tablet.

8. A method of cutting as listed in claim 7 consisting of:
controlling the cutting head with the DXF file output for each drawer; controlling the XYZ cutting table movements with the DXF file output for each drawer; selecting an insert material color that meets the customer's physical requirements; selecting an insert material that meets the customer's marking requirements; selecting an insert material that meets the customer's environmental requirements; cutting DXF patterns into any variety of opaque foam materials of varying thickness; cutting DXF patterns into any opaque hard plastic backing of varying thickness; selecting a backing material that meets the customer's marking requirements selecting a backing material color that will meet the customer's physical requirements; selecting a backing material that meets the customer's environmental requirements; repeating the cutting routines to produce the required number of foam inserts and backs; selecting a cutting head that is capable of cutting the above materials; selecting a XYZ table that meets the size requirements of the customer; selecting cutting software that is compatible with the selected cutting head and XYZ table.

9. A method of assembling the foam outlines and the plastic backing as listed in claim 8 consisting of: selecting foam manufactured with an integral pressure sensitive adhesive (PSA) backing coated with a protective wax paper cover;
removing the protective wax paper from the foam outlines either manually or via machinery; joining the foam outline with PSA backing to the corresponding hard plastic backing; applying sufficient pressure to the assembled foam insert to complete the bonding process.

10. A method of marking item descriptions as listed in claim 7 consisting of;
selecting a marking head that can produce readable marks on the selected backing and items; selecting marking software that is compatible with the selected marking head; adjusting the marking timing to properly mark the selected material; selecting a XYZ table that meets the size requirements of the customer; selecting software that is compatible with the selected XYZ table; controlling the XYZ marking table motion with the machine files output for each drawer; controlling the pocket descriptions with the DXF file output for each drawer; marking the pocket descriptions on the backing inside the perimeter of the item pocket; repeating the marking routines to produce the required number of foam inserts and backs; generating the pocket descriptions via data from an externally referenced spreadsheet file; marking in the required format.

11. A method of etching items to be placed in the assembly as listed in claim 9 consisting of: arranging the items appropriately within the foam inserts; adjusting the marking timing to properly mark the selected material; adjusting the item surface reflectivity to properly mark the selected material; generating the etch codes via data from an externally referenced spreadsheet file; etching in the required format; marking the etch codes directly on the items; repeating the etch routine to produce the required number of item marks.

* * * * *